United States Patent
West

(10) Patent No.: US 9,400,131 B2
(45) Date of Patent: Jul. 26, 2016

(54) ATMOSPHERIC WATER GENERATION SYSTEMS AND METHODS

(71) Applicant: Moses West, Garden Ridge, TX (US)

(72) Inventor: Moses West, Garden Ridge, TX (US)

(73) Assignee: Moses West, Garden Ridge, TX (US)

(*) Notice: Subject to any disclaimer, the term of this patent is extended or adjusted under 35 U.S.C. 154(b) by 124 days.

(21) Appl. No.: 14/329,613

(22) Filed: Jul. 11, 2014

(65) Prior Publication Data
US 2015/0107281 A1   Apr. 23, 2015

Related U.S. Application Data

(60) Provisional application No. 61/892,209, filed on Oct. 17, 2013.

(51) Int. Cl.
*F25D 21/14* (2006.01)
*B01D 5/00* (2006.01)

(52) U.S. Cl.
CPC ............. *F25D 21/14* (2013.01); *B01D 5/0012* (2013.01); *B01D 5/0015* (2013.01)

(58) Field of Classification Search
CPC ......... F25D 21/14; F25D 21/00; F25D 21/06; B01D 5/001; B01D 5/0012; B01D 5/0015
USPC ............................................. 62/93, 285, 291
See application file for complete search history.

(56) References Cited

U.S. PATENT DOCUMENTS

| | | | | |
|---|---|---|---|---|
| 2,763,132 A * | 9/1956 | Jue | ................. | B01D 53/26 62/152 |
| 7,550,218 B2 * | 6/2009 | Hoffjann | ................. | B01D 53/02 429/440 |
| 2006/0248909 A1 * | 11/2006 | Choi | ................. | F24F 1/027 62/280 |
| 2009/0101315 A1 * | 4/2009 | Cheng | ................. | H01L 23/467 165/104.31 |
| 2010/0083673 A1 * | 4/2010 | Merritt | ................. | E03B 3/28 62/93 |
| 2010/0212335 A1 * | 8/2010 | Lukitobudi | ................. | B01D 5/0003 62/93 |
| 2010/0263396 A1 * | 10/2010 | Ritchey | ................. | B01D 5/0006 62/291 |
| 2010/0326101 A1 * | 12/2010 | Scesney | ................. | B01D 5/0039 62/119 |
| 2011/0247353 A1 * | 10/2011 | Metz | ................. | B01D 5/0003 62/291 |
| 2012/0097748 A1 * | 4/2012 | Kanaya | ................. | F24F 1/0014 236/49.3 |
| 2012/0247135 A1 * | 10/2012 | Fakieh | ................. | E03B 3/28 62/129 |

* cited by examiner

*Primary Examiner* — Mohammad M Ali
(74) *Attorney, Agent, or Firm* — William N. Hulsey; Jeffrey D. Hunt; Hulsey Hunt & Parks, P.C.

(57) ABSTRACT

Systems and methods for generating liquid water include multiple atmospheric water generation devices adapted to produce liquid water from atmospheric humidity, used in conjunction with a turbine. The turbine is usable to simultaneously provide power to the devices, while the air intake thereof is used to move air associated with the devices, enabling a generally continuous supply of atmospheric air to be processed while reducing the accumulation of heat associated with the devices.

17 Claims, 3 Drawing Sheets

ATMOSPHERIC WATER GENERATION SYSTEMS AND METHODS

CROSS-REFERENCE TO RELATED APPLICATIONS

The present application claims priority to the U.S. provisional application for patent, having the application Ser. No. 61/892,209, filed Oct. 17, 2013, which is incorporated by reference herein in its entirety.

FIELD

Embodiments usable within the scope of the present disclosure relate, generally, to systems and methods for generating liquid water, and more specifically, to systems and methods for providing continuous airflow to atmospheric water generation devices to enable production of liquid water on an industrial scale.

BACKGROUND

While the large majority of the Earth's surface is composed of water, potable/drinkable water remains a scarce resource in many areas. Sources of fresh water are limited, primarily, to the collection and purification of rainwater and/or water from natural freshwater sources, such as lakes, rivers, underground reservoirs/aquifers, etc. Technological advances have also enabled saltwater from oceans and other high-salinity bodies to be purified through a desalninifaction process; however such processes are costly and time-consuming, requiring specialized equipment and a significant energy expenditure, while producing a relatively low yield of usable fresh water. Technological advances have also enabled reclamation and/or purification of used water, but the amount of usable water recovered through these methods is also fairly limited. Absent the collection of groundwater and rainwater, and the treatment of wastewater, efforts to combat the scarcity of water have primarily been limited to conservation measures.

The Earth's atmosphere contains a significant amount of water, in the form of vapor (e.g., humidity). While condenser devices and similar types of equipment (generically termed "atmospheric water generation devices" herein), can be used to remove this humidity from the atmosphere and covert the removed water vapor to liquid water, such devices are not usable on an industrial scale to produce large quantities of water. This is due, in part, to the fact that water, when in a vapor state, occupies a larger volume than when in liquid or solid states. As such, a very large volume of air must be processed using an atmospheric water generation device to obtain a relatively small quantity of liquid water. Additionally, multiple atmospheric water generation devices cannot be effectively operated within close proximity of one another, because the devices would process the same body of air, resulting in only a minimal increase in the yield of liquid water. Attempts to provide an increased supply of air to atmospheric water generation devices typically consume an impractical quantity of energy due to the large volume of air required to obtain a small volume of liquid water, causing industrial use of atmospheric water generation devices to be non-economical.

SUMMARY

Embodiments usable within the scope of the present disclosure relate to systems and methods for generating liquid water. A plurality of atmospheric water generation devices (e.g., devices adapted to condense water vapor from ambient air to produce liquid water) can be placed within close proximity to one another (e.g., 10 meters apart, or closer, possibly within an enclosed facility), and placed in communication with one or more air moving devices usable to continuously move air into association with the atmospheric water generation devices. Through use of ducts and/or similar conduits, the atmospheric water generation devices can be operatively isolated from one another, and thus able to be used within close proximity to one another without interfering with the operations of adjacent/nearby atmospheric water generation devices.

In a specific embodiment, a turbine (e.g., powered using a natural gas engine or similar driver) can be used to power the atmospheric water generation devices. During normal operation, a turbine requires a significant inflow of air (e.g., to cool and/or operate the turbine). The intake of the turbine can be provided in communication with the atmospheric water generation devices (e.g., via ductwork or similar air conduits), such that operation of the turbine to power the atmospheric water generation devices simultaneously moves air associated with the atmospheric water generation devices. The atmospheric water generation devices can in turn be placed in communication with an ambient source of air (e.g., air external to the facility housing the atmospheric water generation devices). Operation of the turbine can thereby draw processed air away from the atmospheric water generation devices, facilitating cooling thereof and the generally continuous intake of atmospheric air (containing water vapor) to the atmospheric water generation devices.

The generally continuous flow of air across the atmospheric water generation devices and the turbine can serve to cool the turbine and atmospheric water generation devices; however, in an embodiment, an additional source of cooling air can be used, if needed, to cool the turbine and/or the atmospheric water generation devices. For example, separate ductwork or similar conduits could be provided to place the turbine and/or atmospheric water generation devices into communication with an ambient or atmospheric source of air that can be drawn into association with system components.

In various embodiments, other types of air moving devices, such as blower/exhaust fans, can be used in place of the turbine (e.g., when a different power source is used), in addition to the turbine (e.g., when the turbine is not in operation), or simultaneously with the turbine (e.g., to provide additional airflow, output, and/or cooling).

In an embodiment, an airflow valve can be used to control the amount and rate/flow of air that is drawn toward and/or into the turbine (e.g., through operation of a door that at least partially obstructs an intake conduit of the turbine). Airflow can be controlled in a similar manner at other points throughout the conduits/ductwork. In an embodiment, control of airflow throughout the system can be managed from a single control point, automatically or manually; however, manual/automatic operation of individual valves directly can also be used without departing from the scope of the present disclosure.

Operation of a plurality of atmospheric water generation devices, e.g., within proximity of one another, can enable production of large quantities of usable water by a single facility.

BRIEF DESCRIPTION OF THE DRAWINGS

In the detailed description of various embodiments usable within the scope of the present disclosure, presented below, reference is made to the accompanying drawings, in which:

FIG. 2 depicts a diagram depicting an exemplary embodiment of an atmospheric water generation device usable within the scope of the present disclosure and describing operation thereof. As depicted in FIG. 2 air is absorbed into the atmospheric water generator as shown in element 1, the air is then cooled via condenser, as shown in element 2, similar to an air conditioner/air refrigerator condenser. The cooled air is then condensed and dripped into the bottom tank as shown in element 3. Ultra violet light (water filter) is present in the bottom tank to sterilize and disinfect the collected water. The collected water is cycled through the remaining water filters to ensure potable pure drinking water at PH 7 as shown in element 4. Element 5 depicts a Polypropylene filter, which may be used to remove fine particles. Further treatment may be provided by:

Carbon filter—to remove contaminants and impurities.

T33 water filter—Remove bad taste and odor in the water.

Reverse Osmosis—The water is passed through a dense membrane to remove unwanted molecules and icons.

Ultra violet—Ultra violet light is present in both bottom and top tanks to sterilize and disinfect the collected water.

Water is stored in the top tank as depicted in element 6. Water is dispensed according, either hot or cold water via heating and cooling coils as shown in element 7.

Figure 3:
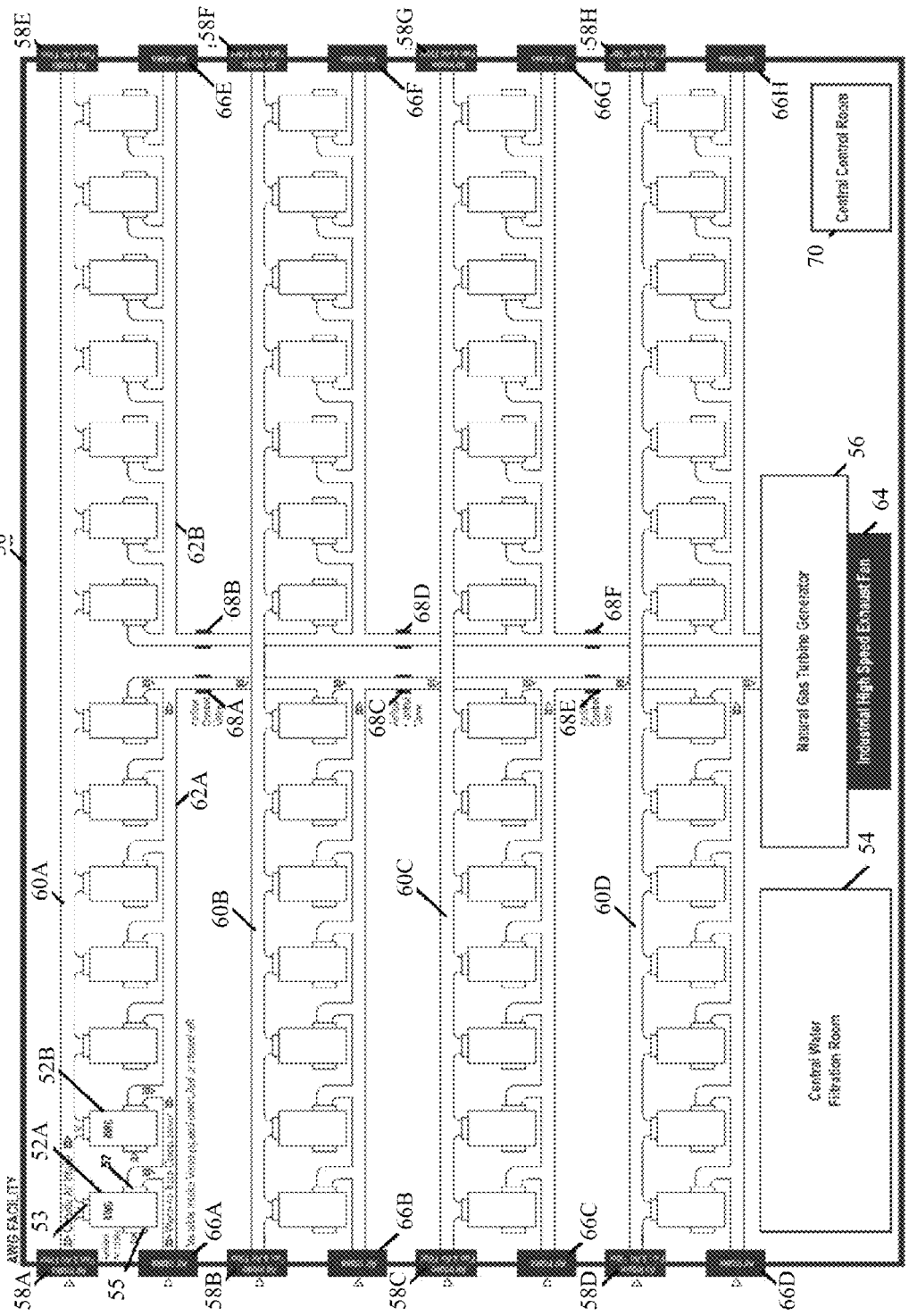

FIG. 3 depicts a diagram of an embodiment of a system usable within the scope of the present disclosure.

One or more embodiments are described below with reference to the listed Figures.

DETAILED DESCRIPTION OF THE EMBODIMENTS

Before describing selected embodiments of the present invention in detail, it is to be understood that the present invention is not limited to the particular embodiments described herein. The disclosure and description herein is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended illustrate and plainly disclose presently preferred embodiments of the invention to one of skill in the art, but are not intended to be manufacturing level drawings or renditions of final products and may include simplified conceptual views as desired for easier and quicker understanding or explanation of the invention. As well, the relative size and arrangement of the components may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Figure 1:
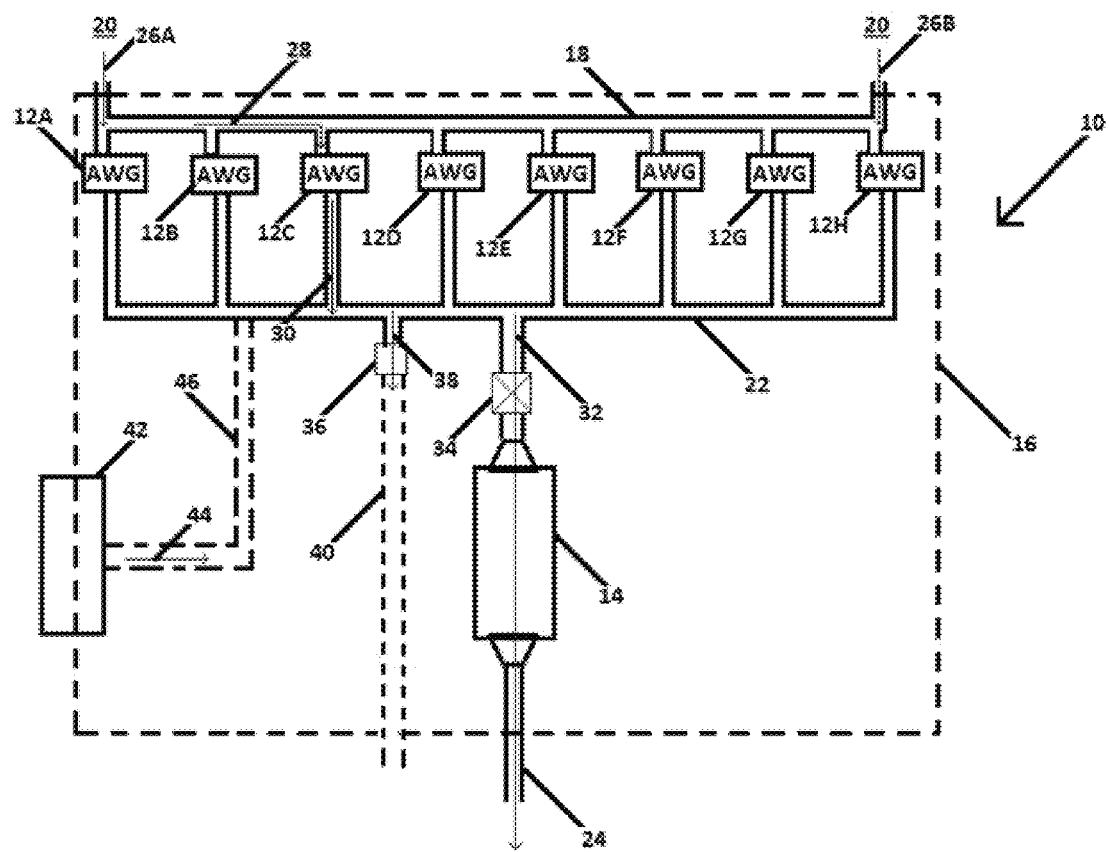
FIG. 1 depicts a diagram of an embodiment of a system usable within the scope of the present disclosure.

FIG. 1 depicts an embodiment of a system (10) usable within the scope of the present disclosure. The depicted system (10) is usable to produce liquid water from atmospheric humidity, e.g., through the provision of generally continuous airflow to a plurality of atmospheric water generation devices (12A-12H). While FIG. 1 depicts eight atmospheric water generation devices (12A-12H), it should be understood that the depicted embodiment is merely illustrative, and that any number of atmospheric water generation devices, arranged in any manner, can be used without departing from the scope of the present disclosure.

Various types of devices usable to condense water vapor from air are known in the art, and generally can include an intake opening, some manner of condenser or heat exchanger, an exhaust opening, and some manner of vessel and/or conduits to store or transport liquid water produced from the water vapor. Any configuration or type of device usable to produce liquid water from air can be used within the present system (10) without departing from the scope of the present disclosure, and the term "atmospheric water generation device" is intended to generically encompass any such device. For example, an embodied atmospheric water generation device can produce liquid water from atmospheric air by: 1) pulling air through a filter; 2) cooling the air to produce condensation; 3) capturing the condensation; and 4) pumping the water through a filtration system (e.g., a 12-stage filtration system). A UV sterilization system (e.g., using dual UV devices) and/or similar processes can also be applied. The pulled air can then be exhausted as additional air is drawn into the device. An exemplary atmospheric water generator is produced by NRG Energy, having corporate offices in Princeton, N.J. and Houston, Tex. Such a water generation unit can, for example, be made from an aluminum alloy with a coating that complies with food safety standards, that prevents internal copper tubing and radiation from contacting water while protecting the internal condenser from erosion, and can operate in conditions ranging from 0 to 114 degrees Fahrenheit. In an embodiment, a defrost detector can deactivate the compressor to conserve energy, while detection of high humidity or high cooling pressure can trigger deactivation of a portion of the condenser while increasing the speed of an associated fan to facilitate efficient water generation. Digital monitoring can enable real time control, which can be automated or manual, and can enable a single individual to operate multiple devices.

Figure 2:
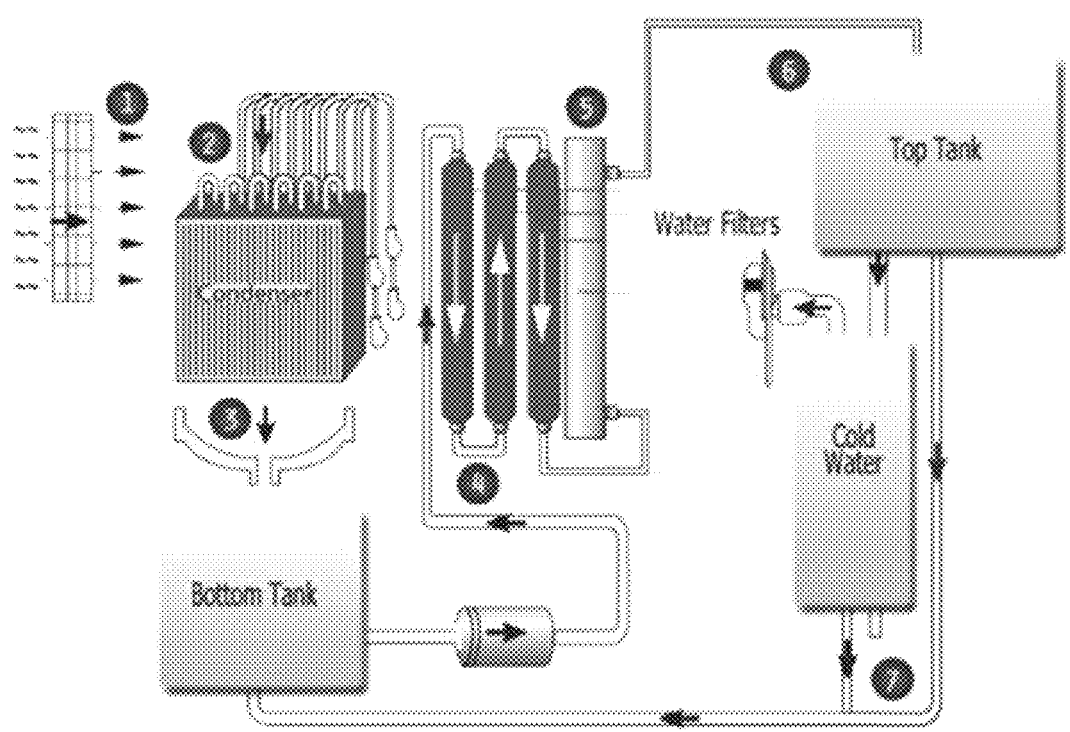

FIG. 2 depicts a diagram depicting an exemplary embodiment of a usable atmospheric water generation device and describing operation thereof.

Returning to FIG. 1, a natural gas turbine (14) can be used to provide power to the atmospheric water generation devices (12A-12H), e.g., through use of cables/conduits (not shown) or any other type of conductor or similar member usable to transmit electrical energy from the turbine (14) to the atmospheric water generation devices (12A-12H). As known in the art, a natural gas turbine includes the coupling of a turbine with a generator (e.g., a reciprocating engine or other type of engine, powered by natural gas); however, other types of generators and/or fuels could be used to drive the turbine (14) without departing from the scope of the present disclosure. Further, it should be noted that while FIG. 1 depicts a single turbine (14) usable to power each of the atmospheric water generation devices (12A-12H), any number and any type of power source could be used without departing from the scope of the present disclosure. For example, in an embodiment, renewable energy sources, such as wind or solar power, could be used to power the devices.

The system (10) is shown enclosed within a facility (16) (e.g., an enclosed building or any other type of housing or enclosure sized to contain the system components and/or protect the system components from environmental conditions). An intake conduit (20) engaged with each of the atmospheric water generation devices (12A-12H) communicates the atmospheric water generation devices (12A-12H) with atmospheric air (20) located exterior to the facility (16), such that the atmospheric air (20) can be channeled from the exterior of the facility (16) to each of the atmospheric water generation devices (12A-12H), then exhausted therefrom. Ductwork (22), or a similar type of conduit, is shown engaged to each of the atmospheric water generation devices (12A-12H) and to the turbine (14), such that air exhausted from the atmospheric water generation devices (12A-12H) is flowed toward the turbine (14). An exhaust duct (24) engaged with the turbine (14) is usable to vent air used to drive and/or cool the turbine (14) to the exterior of the facility (16).

While any manner of air moving device and power source can be used without departing from the scope of the present disclosure, the embodiment shown in FIG. 1 utilizes the depicted turbine (14) as both a power source and an air moving device. During normal operations, a turbine requires a significant air intake, e.g., to cool and/or drive the turbine. As such, when the turbine (14) is operated to power the atmospheric water generation devices (12A-12H), the intake of air toward the turbine (14) can facilitate the movement of atmospheric air (20) into the intake conduit (18), as illustrated by flowpaths 26A and 26B. In an embodiment, operation of the atmospheric water generation devices (12A-12H) themselves can be sufficient to draw atmospheric air thereto. This air is drawn into association with each of the atmospheric water generation devices (12A-12H), which is illustrated using an exemplary flowpath (28) toward the third atmospheric water generation device (12C). As the air passes through the atmospheric water generation devices (12A-12H) and is processed, atmospheric water vapor is converted to liquid water, while the remaining components of the air are exhausted through the ductwork (22), as illustrated by exemplary flowpath 30. Operation of the turbine (14) draws the exhausted air from each of the atmospheric water generation devices (12A-12H) through the ductwork (22) and to the turbine (14), where the air can cool and/or drive the turbine (14), prior to being exhausted via exhaust duct (24). In this manner, operation of the turbine (14) to power the atmospheric water generation devices (12A-12H) can simultaneously remote heated/processed air from the vicinity of the atmospheric water generation devices (12A-12H) and facilitate the provision thereof with a generally continuous flow of atmospheric air, thereby enabling continuous production of liquid water.

An airflow valve (34) is shown proximate to the turbine (14) and can be used to control the flow of air thereto, e.g., by at least partially closing a door and/or otherwise obstructing the turbine intake and/or an adjacent/associated conduit. It should be understood that while FIG. 1 depicts a single valve (34) usable to control the flow of air toward the turbine (14), any portion of the system (10) could be provided with one or more valves, e.g., to control the flow of air to individual atmospheric water generation devices, through various portions of the intake conduit (18) or ductwork (22), and/or elsewhere within the system (10). In an embodiment, operation of the airflow valve (34) and any other valves present within the system (10), as well as operation of the turbine (14), atmospheric water generation devices (12A-12H), and any other fans, blowers, valves, and/or other equipment, can be controlled remotely (e.g., from a single control point), and can be configured for automatic or manual operation.

In an embodiment, a blower fan (36) or similar type of air moving device can be used, for example, when a turbine is not installed and/or when the turbine (14) is not currently operating. Alternatively or additionally, the blower fan (36) could be used simultaneously while the turbine (14) is operating to provide increased airflow and/or cooling to the atmospheric water generation devices (12A-12H), e.g., by drawing atmospheric air (20) along flowpaths 26A, 26B, 28, 30, and 38. An optional conduit (40) for venting air drawn by the blower fan (36) to the exterior of the facility (16) is shown; however, in various embodiments, air from a blower fan (36) could simply pass into the facility (16).

In various embodiments, the turbine (14) may produce a larger quantity of energy than what is necessary to operate the atmospheric water generation devices (12A-12H), in which case, excess electricity can be transmitted to a grid-based power source (not shown), e.g., for payment.

In various embodiments, it may be desirable to provide the turbine (14) with additional intake of air, beyond what is drawn from the atmospheric water generation devices (12A-12H) (e.g., to further cool or drive the turbine (14)). In such embodiments, the blower fan (36) could be reversed to flow air toward the turbine (14), or omitted, such that the turbine (14) draws air through the opening (either pulling air from within the facility (16), or from the exterior thereof if the conduit (40) is present). It should be understood that one or more additional intake openings could be anywhere within the system (10), including directly on the turbine body, within the ductwork (22), within the intake conduit (18), or in communication with the turbine (14) via separate conduits that communicate between the turbine (14) and air external to or within the facility (16).

FIG. 1 also depicts a cooling fan (42) engaged with the system (10) and oriented to discharge cooling air from the exterior of the facility (16) into the interior thereof, e.g., to cool the turbine (14) and/or the atmospheric water generation devices (12A-12H). Optionally, a conduit (46) could communicate the cooling fan (42) with the ductwork (22), or any other component of the system (10), such that air can be flowed toward the turbine (14) and/or through other system components (e.g., the atmospheric water generation devices (12A-12H)), as illustrated by flowpath 44.

It should be understood that the depicted cooling fan (42) is merely illustrative of one generic method by which system components could be provided with a source of cooling air, in addition to the airflow generated through operation of the turbine (14). In various embodiments, airflow generated through operation of the turbine (14) may be sufficient to cool the system, and no cooling fan or other means of cooling may be necessary. In other embodiments, the turbine (14) and/or one or more of the atmospheric water generation devices (12A-12H) could be provided with an associated/attached cooling fan or similar cooling and/or heat exchanging apparatus. In still other embodiments, the turbine (14) and/or one or more of the atmospheric water generation devices (12A-12H) could be provided with conduits associated with air external to the facility (16) to facilitate cooling.

FIG. 3 depicts a diagram of an embodiment of a system usable within the scope of the present disclosure, the system being enclosed within a facility (50) (e.g., a building or similar type of generally enclosed structure). The depicted embodiment includes fifty-six atmospheric water generation devices, of which an exemplary two devices (52A, 52B) are labeled for reference. While the atmospheric water devices are shown arranged in eight groups of seven devices, and four rows that each include two groups of devices, it should be understood that any arrangements and configurations can be used without departing from the scope of the present disclosure, limited only by space and engineering constraints.

Each atmospheric water generation device can include, generally, an intake fan or similar air moving device, positioned at an intake opening of which a single opening (53) is labeled for reference, a compressor/condenser/dehumidifier or other type of device usable to convert atmospheric water vapor to liquid water, and an exhaust opening of which a single opening (57) is labeled for reference, usable to expel processed air. To facilitate cooling and/or operation of the device, one or more additional intake openings (55) for ambient air (e.g., air within the facility (50)) can also be present. While usable atmospheric water generation devices could include filtration and/or sterilization systems (e.g., UV sterilization lights and/or similar devices), individual filtration/sterilization systems for each atmospheric water generation device can be omitted in lieu of a central filtration system (54) that can receive and process water produced by each atmospheric water generation device and flowed to the central filtration system (54) via various conduits (not shown). Use of a central filtration system in lieu of similar components within each atmospheric water generation device reduces the size and expense of each atmospheric water generation device, and also avoids the difficulties inherent in maintaining and/or replacing individual filters and sterilization components.

A natural gas turbine (56) is usable to power each of the atmospheric water generation devices, and/or other system components, and in many cases, may produce power in excess of that required by the system, enabling energy that is produced to be transmitted to a grid-based power system, e.g., for sale. As described previously, other types of power sources could be used without departing from the scope of the present disclosure. The turbine (56) is shown in operative communication with each of the atmospheric water generation devices via two exhaust conduits (62A, 62B), which extend from the exhaust opening (e.g., opening (57)) of each atmospheric water generation device to the turbine (56). While FIG. 3 depicts a single turbine (56), it should be understood that any number of power sources can be provided, e.g., for redundancy/backup purposes, and/or for simultaneous use providing energy.

The facility (50) is shown having eight intake openings (58A-58H) therein, through which atmospheric air external to the facility (50) can be drawn for processing by the atmospheric water generation devices. Two intake openings (58A, 58E) are shown in communication with a first intake conduit (60A), which communicates external air from these openings (58A, 58E) to the first row of atmospheric water generation devices. Similarly, two intake openings (58B, 58F) communicate with the second row of atmospheric water generation devices via a second intake conduit (60B), two intake openings (58C, 58G) communicate with the third row of atmospheric water generation devices via a third intake conduit (60C), and two intake openings (58D, 58H) communicate with the fourth row of atmospheric water generation devices via a fourth intake conduit (60D). In an embodiment, one or more of the intake openings (58A-58H) can include a fan or similar air moving device to facilitate drawing air therethrough toward the atmospheric water generation devices; however, in various embodiments, the ability of the atmospheric water generation devices to move air (e.g., using associated fans) may be sufficient to draw air through the intake openings (58A-58H) without requiring additional fans at the openings. In various embodiments, operation of the turbine (56) could also serve to draw air through the intake openings (58A-58H) and toward the atmospheric water generation devices. An additional exhaust fan (64) is shown associated with the turbine (56) and can be used simultaneously therewith to provide additional airflow, and/or during times when the turbine (56) is not in operation. In an embodiment, one or more of the intake openings (58A-58H) could include an air filter or similar device for removal of solid particulates and/or other contaminants/impurities from air passing therethrough.

FIG. 3 also depicts eight cooling intakes (66A-66H) for communicating atmospheric air into the facility (50) and to the turbine (56) via the exhaust conduits (62A, 62B). For example, four of the cooling intakes (66A-66D) are shown in communication with the first exhaust conduit (62A), while four of the cooling intakes (66E-66H) are shown in communication with the second exhaust conduit (62B). In an embodiment, the cooling intakes (66A-66D) can include fans and/or filters, as described above with reference to the intake openings (58A-58H).

In operation, fans and/or similar air moving devices in each of the atmospheric water generation devices (e.g., devices (52A, 52B)), fans and/or air moving devices in the intake openings (58A-58H), the airflow generated by operation of the turbine (56) to power the atmospheric water generation devices, and/or the airflow generated by the exhaust fan (64) can cause atmospheric air to be drawn into the facility (50) through the intake openings (58A-58H), and into the respective associated intake conduits (60A-60D). Air from the intake conduits (60A-60D) can subsequently be drawn into the atmospheric water generation devices (e.g., devices (52A, 52B), via intake openings (53) thereof) and processed, to produce liquid water that can be flowed and/or otherwise transported to the centralized filtration system (54) for processing.

Operation of atmospheric water generation devices can produce a significant quantity of heat (e.g., in the form of heated air). As such, while the intake of ambient air via additional intake opening (55) can at least partially cool the atmospheric water generation devices and facilitate continuous operation thereof, FIG. 3 depicts the exhaust conduits (62A, 62B) being operable for receiving exhausted, warm air from each of the atmospheric water generation devices, for preventing the accumulation of heat proximate to the atmospheric water generation devices that could prevent or reduce the useful operation of adjacent devices. Operation of the turbine (56) to power the atmospheric water generation devices typically requires a significant intake of air, and thus, operation of the turbine (56) can draw the warm air from the atmospheric water generation devices through the exhaust conduits (62A, 62B) toward the turbine (56). The associated exhaust fan (64) can be used simultaneously with the turbine (56), or indepedently at times when the turbine (56) is not operating.

To facilitate cooling of the turbine (56) and to ensure sufficient air intake thereof, operation of the turbine (56) can further draw air into the exhaust conduits (62A, 62B) via the cooling intakes (66A-66H), toward the turbine (56). In an embodiment, the exhaust fan (64) can be operated simultaneously with the turbine (56), or independently, to facilitate such air flow. Depending on the operating parameters of the turbine (56), in various embodiments, the cooling intakes (66A-66H) could be equipped with control valves to regulate the amount and/or rate of air passing therethrough. The intake openings (58A-58H) could similarly be provided with valves to control airflow into the system. In a similar manner, one or more of the atmospheric water generation devices could be provided with valves or other control features usable to regulate the amount of air taken in by a respective device and/or the amount of air exhausted therefrom.

FIG. 3 depicts six airflow control valves (68A-68F) positioned within the exhaust conduits (62A, 62B), each valve associated with one set of seven atmospheric water generation devices. Partial or full closure of any one of the valves can thereby limit or prevent the flow of air from one set of atmospheric water generation devices and one cooling intake toward the turbine (56). It should be understood that the depicted number and position of the airflow control valves (68A-68F) is merely exemplary, and that any number of flow control devices can be positioned at any location within the system.

In an embodiment, operation of the airflow control valves (68A-68F) can be controlled from a central control system (70). In various embodiments, operation of the turbine (56), exhaust fan (64), filtration system (54), any fans and/or valves in the intake openings (58A-58H) or cooling intakes (66A-66H), and/or one or more of the atmospheric water generation devices could be controlled from the central control system (70). As such, a single individual could control the entirety of the depicted system, on-site or remotely, using any combination of manual or automatic controls. In an embodiment, the control system (70) can be configured to automatically actuate and/or deactivate one or more system components responsive to various detected conditions. Any manner of sensors and/or measurement devices can be used to determine the presence or absence of such conditions.

As such, embodiments usable within the scope of the present disclosure can allow for the continuous production of liquid water, on an industrial scale, using multiple atmospheric water generation devices in conjunction with a power source and air moving device.

There are 3.1 quadrillion gallons of water in the atmosphere at any given time, and most types of atmospheric water generation devices can produce a sufficient yield of water using atmospheric air with a humidity as low as 35%, enabling embodiments of the present system to be constructed and used at nearly any location. Atmospheric water produced using embodied types of atmospheric water generation devices can be 99.9% pure (e.g., through use of filters), exceeding regulatory requirements, while requiring no chemicals or treatment additives, and reducing the impact of consumption by enabling generation of water at or near the point of consumption (e.g., thereby reducing the need to collect and/or transport large quantities of water), and producing no significant pollutants or by-products.

As such, while an individual atmospheric water generation device can potentially produce from 1,000 to 10,000 gallons of water per day using humidity naturally present in the atmosphere, embodiments of the systems and methods described herein can enable the generally continuous provision of atmospheric air to such a system, and can further enable multiple atmospheric water generation devices to be used in close proximity, thereby enabling liquid water to be produced on an industrial scale. Potentially, several hundred atmospheric water generation devices could be operated at a single location (e.g., an enclosed facility), in close proximity to one another, even though such a use is outside of the typical recommended operating parameters of individual atmospheric water generation devices. The provision of a generally continuous flow of atmospheric air to the devices can enable maximum output from each device, with little to no degradation caused by the use of multiple devices in close proximity, primarily due to the operative isolation of each of the atmospheric water generation devices from one another.

Use of a turbine or similar device to continuously draw air associated with a plurality of atmospheric water generation devices can aid in both operation and cooling of the devices, e.g., by drawing large quantities of warm air away from the devices and/or facilitating the intake of fresh air thereto. Diversion of hot air away from the devices can allow the atmospheric water generation devices, and the associated turbine, to function at normal or improved capacity. Use of exhaust/blower fans and/or similar types of air moving devices can enable optional/selective operation of the turbine, or simultaneous operation of the turbine and one or more other air moving devices to allow increased airflow through the system. Control of airflow through the system can be achieved through use of one or multiple airflow valves, automatically or manually, from a central control and/or other control points as needed.

Use of dedicated/external power sources, such as gas generators coupled with turbines, can enable continuous production of liquid water, even during interruptions in electrical service, such as inclement weather.

While various embodiments usable within the scope of the present disclosure have been described with emphasis, it should be understood that within the scope of the appended claims, the present invention can be practiced other than as specifically described herein.

What is claimed is:

1. A system for generating liquid water, the system comprising:
    a plurality of atmospheric water generation devices adapted to produce liquid water using atmospheric humidity;
    at least one air moving device in communication with the plurality of atmospheric water generation devices via an air conduit;
    a power source in communication with the plurality of atmospheric water generation devices and said at least one air moving device; and
    an airflow valve configured to control a quantity or rate of air flowed to the turbine,
    wherein said at least one air moving device continuously moves air associated with the plurality of atmospheric water generation devices to facilitate production of liquid water by the plurality of atmospheric water generation devices,
    wherein said at least one air moving device comprises a turbine configured to actuate the plurality of atmospheric water generation devices.

2. The system of claim 1, wherein the air conduit isolates a first atmospheric water generation device of the plurality of atmospheric water generation devices from a second atmospheric water generation device of the plurality of atmospheric water generation devices.

3. The system of claim 2, wherein the first atmospheric water generation device is positioned ten meters or less from the second atmospheric water generation device.

4. The system of claim 1, wherein the plurality of atmospheric water generation devices are positioned within an enclosed facility, and wherein the air conduit communicates the plurality of atmospheric water generation devices with air external to the enclosed facility.

5. The system of claim 1, wherein said at least one air moving device comprises a fan.

6. The system of claim 1, wherein the power source comprises a generator in communication with the turbine for powering the turbine to actuate the plurality of atmospheric water generation devices.

7. The system of claim 1, further comprising cooling conduits configured to flow cooling air into association with the plurality of atmospheric water generation devices, said at least one air moving device, the power source, or combinations thereof.

8. A system for generating liquid water, the system comprising:
- a plurality of atmospheric water generation devices adapted to produce liquid water using atmospheric humidity;
- a turbine in communication with and powering the plurality of atmospheric water generation devices; and
- an intake conduit of the turbine in communication with the plurality of atmospheric water generation devices, wherein operation of the turbine flows air associated with the plurality of atmospheric water generation devices; and
- an airflow valve configured to control a quantity or rate of air flowed to the turbine.

9. The system of claim 8, wherein at least two of the atmospheric water generation devices are operatively isolated from one another and positioned ten meters or less from one another.

10. The system of claim 8, wherein the plurality of atmospheric water generation devices are positioned within an enclosed facility, and comprise at least one conduit that communicates the plurality of atmospheric water generation devices with air external to the enclosed facility.

11. The system of claim 8, further comprising cooling conduits configured to flow cooling air into association with the plurality of atmospheric water generation devices, said at least one air moving device, the power source, or combinations thereof.

12. A method for generating liquid water, the method comprising the steps of:
- operating a turbine to power a plurality of atmospheric water generation devices;
- flowing air associated with the plurality of atmospheric water generation devices using operation of the turbine, wherein the plurality of atmospheric water generation devices produce liquid using humidity in the air; and
- flowing air from the plurality of atmospheric water generation devices to the turbine.

13. The method of claim 12, wherein the step of flowing air into association with the plurality of atmospheric water generation devices comprises flowing air external to an enclosed facility into the enclosed facility, and wherein the plurality of atmospheric water generation devices are positioned within the enclosed facility.

14. The method of claim 12, wherein the step of flowing air into association with the plurality of atmospheric water generation devices comprises flowing air to a first atmospheric water device and a second atmospheric water device, and wherein the first atmospheric water device is positioned a distance of ten meters or less from the second atmospheric water device.

15. The method of claim 12, further comprising cooling air into association with the turbine, the plurality of atmospheric water generation devices, or combinations thereof to cool the turbine, the plurality of atmospheric water generation devices, or combinations thereof.

16. The method of claim 12, wherein the step of flowing air from the plurality of atmospheric water generation devices to the turbine comprises operating an airflow valve to control a rate of airflow toward the turbine, a quantity of air flowed to the turbine, or combinations thereof.

17. The method of claim 12, further comprising communicating excess power produced by the turbine to a grid system.

* * * * *